United States Patent [19]
Ohgaki et al.

[11] Patent Number: 5,954,573
[45] Date of Patent: Sep. 21, 1999

[54] METHOD FOR BLEEDING POULTRY

[75] Inventors: Hideki Ohgaki; Hiroyuki Maezono; Masashi Izawa, all of Koshigaya, Japan

[73] Assignee: Licno Japan Ltd., Koshigaya, Japan

[21] Appl. No.: 08/975,278

[22] Filed: Nov. 20, 1997

[30] Foreign Application Priority Data

Nov. 22, 1996 [JP] Japan .................................. 8-325906

[51] Int. Cl.⁶ .............................. A22B 3/06; A22C 21/00
[52] U.S. Cl. ............................................. 452/67; 452/58
[58] Field of Search .............................. 452/63, 67, 58, 452/59

[56] References Cited

U.S. PATENT DOCUMENTS

| | | | |
|---|---|---|---|
| 3,555,594 | 1/1971 | Groover et al. | 452/67 |
| 4,092,761 | 6/1978 | McWhirter | 452/58 |
| 4,354,296 | 10/1982 | Robinson | 452/63 |

*Primary Examiner*—Willis Little
*Attorney, Agent, or Firm*—Oblon, Spivak, McClelland, Maier & Neustadt, P.C.

[57] ABSTRACT

A method is disclosed for bleeding a live fowl upon processing the fowl after severing a carotid artery of the fowl. According to the method, electric pulses are applied across the fowl promptly after the carotid artery of the fowl is severed. Preferably, the electric pulses are applied for 3 to 10 seconds upon an elapsed time of 1 to 10 seconds after the carotid artery of the fowl is severed.

14 Claims, 2 Drawing Sheets

METHOD FOR BLEEDING POULTRY

BACKGROUND OF THE INVENTION a) Field of the Invention

This invention relates to a method for bleeding fowl, and more specifically to a method for efficiently bleeding fowl in dressing the same. The word "fowl" as used herein means poultry birds such as broilers, ducks, geese or turkeys.

b) Description of the Related Art

Conventionally, dressing and processing work includes various steps conducted at a processing plant, such as killing, bleeding, plucking, gutting (evisceration), and cutting-up of eviscerated and chilled fowl into big portions, leg meat, breast meat, tenderloin meat, wings and wing tips, and the like.

The killing and bleeding in the above-described steps are generally performed by severing the carotid arteries of live fowl. This severing of the carotid arteries of the live fowl would however result in the occurrence of much damages such as wing and wing tip breaks because the live fowl move wild immediately after being severed. Accordingly, bleeding has been conducted for many years by conveying live fowl through an atmosphere of carbon dioxide gas to anesthetize them and then severing the carotid arteries of the fowl.

This method is however scarcely used these days, because it is accompanied by a high cost due to the use of carbon dioxide gas and a need for larger facilities although it can avoid damage to fowl such as wing and wing tip breaks.

In place of the above-described method, another method is used nowadays. As disclosed, for example, in Japanese Patent Publication No. 2,527,142, an electric voltage is applied across live fowl to stun the same, and bleeding is then conducted. This method has overcome the cost problem of the above-described method and is free of the problem of wing and wing tip breaks, but involves a problem of bleeding not being able to be achieved sufficiently. Described specifically, when fowl bled by this method are dressed in a subsequent step, congested parts and blood spots of various sizes remain in deboned meat such as breast and tenderloin, leading to a problem that the quality of the deboned meat is substantially lowered.

The occurrence of such a problem seems to be attributable to occurrence of a sudden and abrupt rise in blood pressure within the live fowl and consequent rupture of blood capillaries upon stunning the fowl by applying an electric voltage thereacross. Concerning the problem of congested parts and blood spots of various sizes remaining in deboned meat as described above, existence of some congestion in the surface of fowl may not be a serious problem in Europe and America where fowl is distributed in the form of eviscerated fowl. However, in Japan where fowl is distributed primarily in the form of portioned meat, deboned meat with such congested parts and blood spots still remaining therein is classified as a low-grade product, leading to a serious problem.

SUMMARY OF THE INVENTION

An object of the present invention is therefore to provide a technique which makes it possible to obtain high-quality deboned meat without congested parts and blood spots in processing fowl and moreover, to reduce damages to fowl such as wing and wing tip breaks.

The above object can be achieved by the present invention as will be described hereinafter. Namely, the present invention provides a method for bleeding a live fowl upon processing said fowl after severing a carotid artery of said fowl, which comprises applying electric pulses across said fowl promptly after said carotid artery of said fowl is severed.

According to the present invention, electric pulses are applied across the live fowl after the carotid artery of the live fowl is severed. Even if a sudden and abrupt rise takes place by electric pulses within the live fowl, the blood capillaries remain ruptured within the live fowl because the carotid artery is in a severed open state. Through the subsequent processing, high-grade deboned meat can therefore be obtained without congestions and blood spots. Further, the application of electric pulses shortly after severing the carotid artery of the live fowl gives no time for the fowl to move wild, thereby making it possible to reduce damages to the fowl such as wing and wing tip breaks.

DETAILED DESCRIPTION OF THE INVENTION AND PREFERRED EMBODIMENTS

Figure 1:
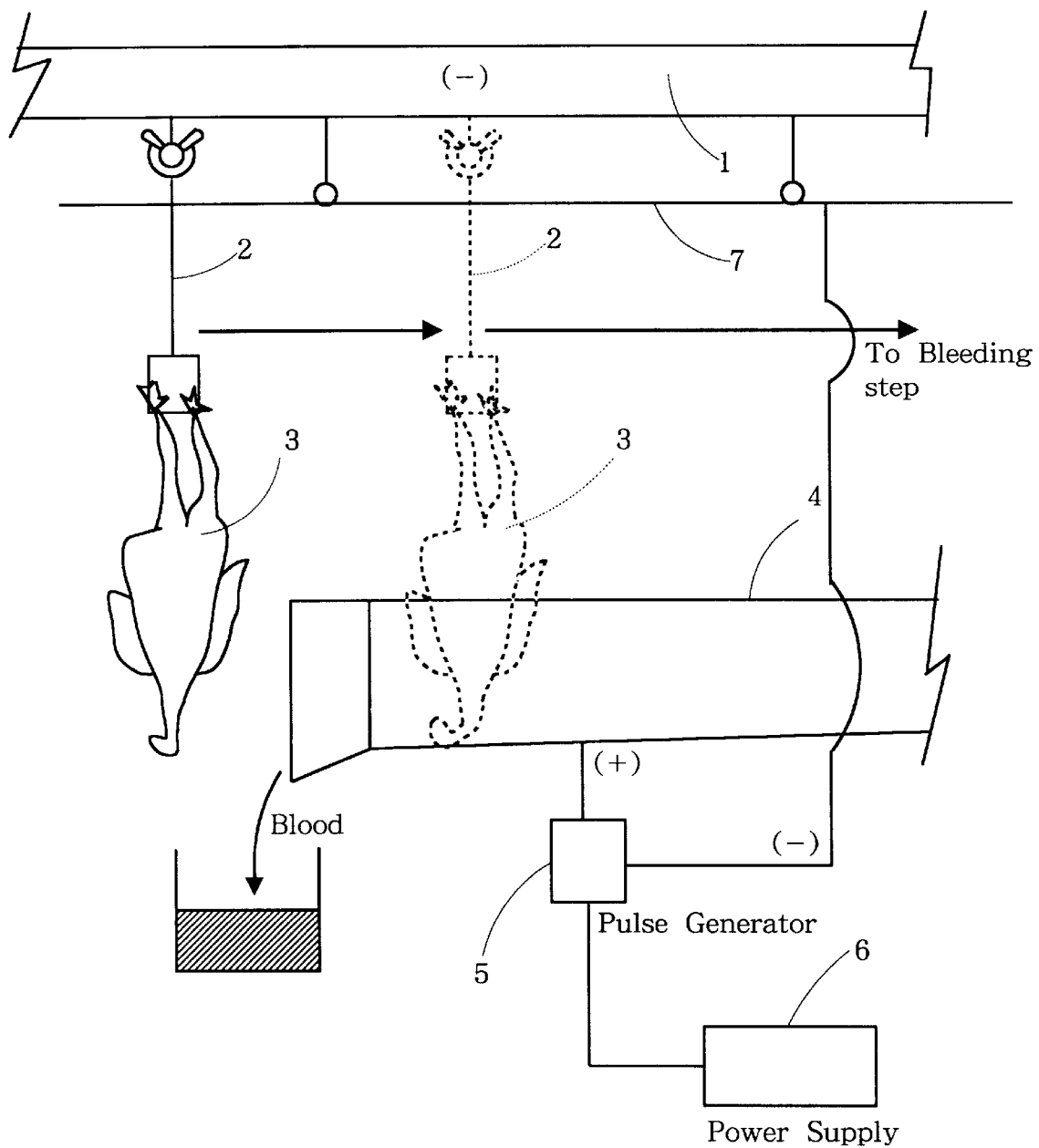
FIG. 1 schematically illustrates a method according to the present invention.

FIG. 1 illustrates the method according to the present invention. In FIG. 1, numeral 1 indicates a support for shackles 2 and a cable-shaped electrode 7. Each shackle 2 suspends a broiler 3 while the shackle 2, at a free end thereof, holds the broiler 3 at lower shanks thereof. The shackle 2 with the broiler 3 suspended therefrom is moved by an unillustrated moving means in a direction indicated by arrows in the drawing while being maintained in contact with the electrode 7. Immediately after the carotid artery of the broiler 3 drawn by solid lines is severed, the broiler 3 is moved in the direction indicated by the arrows, and is then brought into contact at a head portion thereof with a bottom portion of a gutter-shaped electrode 4 one of opposite end portions of which is open. At this time, a bottom wall of the electrode 4 has been covered to a shallow depth with blood bled out from broilers bleeding of which was already completed, so that the electrode 4 is electrically connected with the head portion or a neck portion of the broiler via the blood.

The bottom portion of the gutter-shaped electrode 4 is inclined somewhat downwardly in a left direction as viewed in FIG. 1, whereby blood bled out from each broiler 3 flows out of the electrode 4 owing to the inclined arrangement. Nonetheless, the bottom portion of the gutter-shaped electrode 4 is always kept wet at a surface thereof by blood. The head portion of the broiler 3 shown by solid lines is suspended with its head portion directed vertically. The gutter bottom portion of the gutter-shaped electrode 4 is however arranged at a position somewhat higher than the head portion of the suspended broiler. In a state that the broiler has been introduced into a gutter portion of the electrode 4 like the broiler 3 shown by dotted lines, its head portion and neck portion are therefore dragged on the surface of the electrode. Further, the bottom portion of the electrode is gently inclined upwardly in a right direction as viewed in the drawing, so that the head portion or neck portion of the broiler is always maintained in contact with the surface of the electrode.

The electrode 4 is connected with a power supply 6 via a pulse generator 5. By the pulse generator 5, pulse signals are delivered to the electrode 4 during bleeding. These pulse signals are applied across the broiler indicated by the dotted lines, so that the bleeding of the broiler is promoted. Incidentally, the above-described cable-shaped electrode 7 arranged in contact with the shackles 2 forms a negative electrode.

Figure 2:
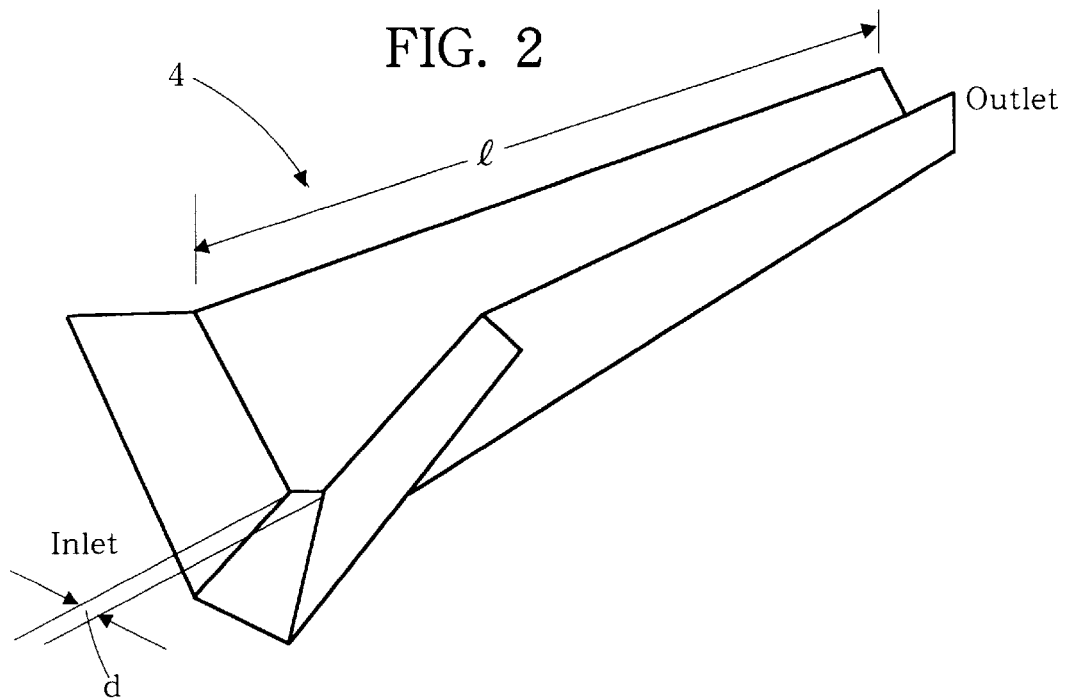
FIG. 2 depicts one example of an electrode for use in the process according to the present invention.

With reference to FIG. 2, the gutter-shaped electrode 4 will next be described in further detail. The length (l) of the gutter-shaped electrode 4 is generally about 2 to 5 meters or so, although it is determined in accordance with the overall length of processing facilities. The gutter bottom portion has a width (d) sufficient to permit smooth passage of the head portion of each broiler. The width (d) can be, for example, about 3 to 10 cm or so. Each broiler generally passes through the electrode 4 in about 3 to 10 seconds, although this period is determined by a processing speed and the length of the electrode.

Figure 3A:
FIG. 3A shows one example of a wave form of pulses for use in the method according to the present invention.
Figure 3B:
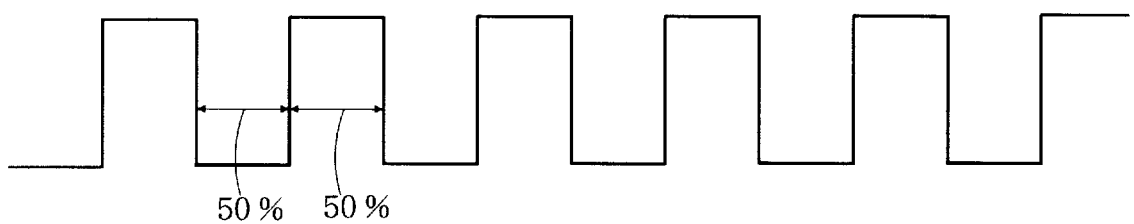
FIG. 3B shows another example of a waveform of pulses for use in the method according to the present invention.

While the head portion or neck portion of each broiler 3 is passing through the gutter-shaped electrode 4, electric pulses are applied across the broiler 3. A preferred voltage of electric pulses applied across each broiler can be from about 10 to 60 volts, with 20 to 40 volts being more preferred. Their preferred frequency can be in a range of from 100 Hz to 2,000 Hz, with a range of from 700 to 1,000 Hz being more preferred. Such electric pulses may be either a.c. electric pulses or d.c. electric pulses. However, most effective electric pulses are pulses of plus components. Best bleeding effects can be obtained when the duty ratio of the pulse width of the plus components falls in a range of from 10% to 50% as shown in FIGS. 3A and 3B which show an illustrative substantially rectangular pulse waveform (plus-side 10% pulse waveform) and another illustrative pulse substantially rectangular waveform (plus-side 50% pulse waveform), preferably in a range of from 20% to 50%.

In the illustrated embodiment, the gutter-shaped electrode serves as a positive electrode while the cable-shaped electrode acts as a negative electrode. The same effects can be brought about even if the positive electrode and the negative electrode are opposite to those in the illustrated embodiment.

It is most desired to perform the application of electric pulses immediately after the carotid artery of each broiler is severed, because wild movements of the broiler can be minimized. In practice, electric pulses can be applied within 1 to 10 seconds, preferably 2 to 10 seconds after severing the carotid artery. A period during which electric pulses are applied can be as long as the period during which the head portion or neck portion of each broiler passes through the gutter-shaped electrode 4, for example, 3 to 10 seconds or so, preferably 2 to 5 seconds or so. No problem arises even if electric pulses are applied during a period longer than the above-mentioned period.

Each broiler, the carotid artery of which has been severed, is brought into a lightly-stunned state by the application of electric pulses. The broiler therefore does not move wild, thereby minimizing damage to the broiler such as wing and wing tip breaks. Another advantage is also considered to be brought about, although this is based on an estimation from experiment results. By the above electric pulses, the blood pressure of the broiler is intermittently caused to undergo a sudden rise. Its carotid artery has already been severed open so that bleeding is promoted without causing rupture of blood capillaries within the broiler. This makes it possible to achieve sufficient bleeding. Through subsequent dressing step, chicken meat of good quality can therefore be obtained without congestion or blood spots.

In the present invention, electric pulses are effective no matter whether they are d.c. or a.c. As described above, however, best results can be obtained when pulse signals of d.c. plus components are used at the specific frequency. These electric pulses are therefore considered to constitute conditions for minimizing the rupture of blood capillaries in each broiler. Further, the use of pulses makes it possible to apply sufficient electric pulses across each broiler even when blood builds up in the bottom portion of the electrode 4.

EXAMPLE 1

The above-described method of the present invention was specifically experimented. At Processing Plant K in the Kyushu District of Japan, the method was used from Aug. 17 to Sep. 11, 1996. As processing conditions, plus-component pulses (duty ratio: 20%) were applied at a voltage of 35 V and a frequency of 1,000 Hz for 4 to 5 seconds upon an elapsed time of 2 to 3 seconds after the carotid artery of each broiler was severed. Experiment results on the percentage of broken wings, the percentage of broken wing tips and the percentage of congested breasts are presented in Table 1.

COMPARATIVE EXAMPLE 1

Another experiment was also conducted in exactly the same manner as in Example 1 except that each broiler was subjected to bleeding without stunning it by electric pulses. Experiment results on the percentage of broken wings and the percentage of broken wing tips are also presented in Table 1.

COMPARATIVE EXAMPLE 2

A further experiment was also conducted in exactly the same manner as in Example 1 except that according to the Example in Japanese Patent Publication No. 2,527,142, an alternative voltage of 35 V was applied for 5 seconds across each broiler from a time point 2 seconds before the carotid artery of the broiler was severed. Experiment results on the percentage of congested breasts are also presented in Table 1.

In each of Example 1 and Comparative Examples 1 and 2, 2,000 broilers were processed per day. Each value in Table 1 is an average value.

TABLE 1

| Date | Average weight of broiler (kg) | Percentage of broken wings | | Percentage of broken wing tips | | Percentage of broken breasts | |
|---|---|---|---|---|---|---|---|
| | | Comp. Ex. 1 | Ex. 1 | Comp. Ex. 1 | Ex. 1 | Comp. Ex. 2 | Ex. 1 |
| 8/17 | 2.5 | 0.45 | 0.11 | 0.18 | 0.14 | 0.19 | 0.09 |
| 8/19 | 2.6 | 0.40 | 0.16 | 0.22 | 0.16 | 0.18 | 0.09 |
| 8/20 | 2.6 | 0.48 | 0.14 | 0.17 | 0.14 | 0.20 | 0.10 |
| 8/21 | 2.7 | 0.65 | 0.13 | 0.19 | 0.13 | 0.15 | 0.07 |
| 8/22 | 2.8 | 0.63 | 0.16 | 0.22 | 0.14 | 0.15 | 0.08 |
| 8/23 | 2.4 | 0.42 | 0.07 | 0.15 | 0.12 | 0.22 | 0.12 |
| 8/24 | 2.4 | 0.48 | 0.10 | 0.16 | 0.12 | 0.10 | 0.03 |
| 8/26 | 2.6 | 0.47 | 0.11 | 0.19 | 0.12 | 0.26 | 0.17 |
| 8/27 | 2.6 | 0.47 | 0.10 | 0.21 | 0.14 | 0.18 | 0.09 |
| 8/29 | 2.5 | 0.38 | 0.12 | 0.20 | 0.11 | 0.19 | 0.10 |
| 8/30 | 2.5 | 0.40 | 0.15 | 0.14 | 0.14 | 0.21 | 0.11 |
| 8/31 | 2.5 | 0.40 | 0.15 | 0.18 | 0.16 | 0.18 | 0.09 |
| 9/2 | 2.6 | 0.40 | 0.20 | 0.22 | 0.08 | 0.22 | 0.10 |

TABLE 1-continued

|  | Average weight of broken wings | Percentage of broken wings | | Percentage of broken wing tips | | Percentage of broken breasts | |
| --- | --- | --- | --- | --- | --- | --- | --- |
| Date | broiler (kg) | Comp. Ex. 1 | Ex. 1 | Comp. Ex. 1 | Ex. 1 | Comp. Ex. 2 | Ex. 1 |
| 9/3 | 2.5 | 0.58 | 0.18 | 0.18 | 0.10 | 0.15 | 0.08 |
| 9/4 | 2.7 | 0.49 | 0.23 | 0.17 | 0.10 | 0.19 | 0.07 |
| 9/5 | 2.7 | 0.65 | 0.26 | 0.22 | 0.12 | 0.20 | 0.12 |
| 9/6 | 2.6 | 0.63 | 0.20 | 0.21 | 0.09 | 0.20 | 0.09 |
| 9/7 | 2.7 | 0.52 | 0.24 | 0.20 | 0.16 | 0.22 | 0.10 |
| 9/9 | 2.7 | 0.54 | 0.24 | 0.22 | 0.17 | 0.13 | 0.04 |
| 9/10 | 2.7 | 0.62 | 0.16 | 0.19 | 0.11 | 0.22 | 0.11 |
| 9/11 | 2.6 | 0.54 | 0.28 | 0.19 | 0.16 | 0.20 | 0.09 |
| Ave. | 2.6 | 0.52 | 0.17 | 0.17 | 0.13 | 0.18 | 0.09 |

Assuming that 50,000 broilers are processed per day, the weight of broken wings in the conventional method of Comparative Example 1 can be calculated as follows based on Table 1: 50,000 broilers×2.8 kg×0.52%=728 kg. The price of undamaged wings is about 300 yen/kg, whereas the price of broken wings is about 150 yen/kg. Multiplying the price difference of 150 yen/kg by the weight of the broken wings, the daily loss due to wing breaks is calculated to be 109,200 yen.

On the other hand, the daily loss in the invention method of Example 1 can be calculated as follows: 109,200 yen× (0.17/0.52)=35,700 yen. Compared with the conventional method of Comparative Example 1, the invention method can bring about a profit of 73,500 yen per day. Calculating for a year (the number of days operated: 250), adoption of the invention method will result in a profit of 18,370,000 yen.

Further, the invention method also led to a substantial decrease in the percentage of congested or blood-spotted breast meat compared with the conventional method of Comparative Example 2 as shown above in Table 1. In addition to the above-described decreasing effect of wing breaks, this decrease in the percentage of congested or blood-spotted breast meat has rendered the method of the present invention still more economical.

In this connection, a trial calculation will hereinafter be made. Assuming that 50,000 broilers are processed per day and also that the weight of each broiler is 2.8 kg, the conventional method of Comparative Example 2 and the invention method can both produce 266 kg/day of deboned meat so that they are not different from each other in the amount of deboned meat. In general, deboned meat is classified into Grade A and Grade B depending on the degree of congestion. The price difference between Grade A and Grade B is 100 yen/kg. A daily difference is therefore 26,600 yen. Calculating for a year (the number of days operated: 250), the difference amounts to 6,650,000 yen. Multiplying this difference by the ratio of the percentage of congested breasts according to the invention method to that according to the conventional method of Comparative Example 2, the yearly difference is calculated as follows: 6,650,000 yen× (0.09/0.18)=3,325,000 yen. Accordingly, adoption of the invention method will also bring about a further profit of 3,325,000 yen in addition to the above-described decreasing effect of wing breaks.

What is claimed is:

1. A method for bleeding a live fowl upon processing said fowl after severing a carotid artery of said fowl, which comprises:

applying substantially rectangular electric pulses across said fowl promptly after said carotid artery of said fowl is severed, thereby intermittently increasing a blood pressure of said fowl in response to said applied substantially rectangular electric pulses.

2. The method of claim 1, wherein said substantially rectangular electric pulses are applied for 3 to 10 seconds upon an elapsed time of 1 to 10 seconds after said carotid artery of said fowl is severed.

3. The method of claim 1, wherein said substantially rectangular electric pulses applied across said fowl have a frequency in a range of from 100 Hz to 2,000 Hz.

4. The method of claim 1, wherein said substantially rectangular electric pulses applied across said fowl consist of pulses of plus components.

5. The method of claim 4, wherein a pulse width of said plus components has a duty ratio in a range of from 10 to 50%.

6. The method of claim 1, wherein said substantially rectangular electric pulses comprise substantially rectangular d.c. electric pulses.

7. A method of processing a fowl, comprising:

severing a carotid artery of said fowl; and intermittently causing a blood pressure of said fowl to suddenly increase by applying substantially rectangular pulses across said fowl.

8. The method according to claim 7, wherein said step of intermittently causing said blood pressure to suddenly increase comprises:

elapsing a time of approximately 1 to 10 seconds after said carotid artery of said fowl is severed; and applying said substantially rectangular pulses for 3 to 10 seconds after said time of approximately 1 to 10 seconds has elapsed.

9. The method according to claim 7, wherein said step of intermittently causing said blood pressure to suddenly increase comprises:

applying said substantially rectangular pulses across said fowl in a frequency range of approximately 100 Hz to 2,000 Hz.

10. The method according to claim 7, wherein in the step of intermittently causing said blood pressure to suddenly increase, the applied substantially rectangular pulses comprise a duty ratio range of approximately 10 to 50%.

11. The method according to claim 7, wherein in the step of intermittently causing said blood pressure to suddenly increase, the applied substantially rectangular pulses consist of plus components.

12. The method according to claim 7, wherein in the step of intermittently causing said blood pressure to suddenly increase, the applied substantially rectangular pulses comprise substantially rectangular d.c. electric pulses.

13. The method of claim 1, further comprising:

grounding at least one foot of said fowl; and said step of applying intermittently applies one of a direct current and an alternating current to one of a head portion and a neck portion of said fowl, thereby passing said one of said direct current and said alternating current through said fowl from said one of said head portion and said neck portion to said at least one foot of said fowl.

14. The method according to claim 7, wherein said step of intermittently causing said blood pressure of said fowl to suddenly increase comprises:

grounding at least one foot of said fowl; and intermittently applying one of a direct current and an alternating current to one of a head portion and a neck portion of said fowl, thereby passing said one of said direct current and said alternating current through said fowl from said one of said head portion and said neck portion to said at least one foot of said fowl.

* * * * *

UNITED STATES PATENT AND TRADEMARK OFFICE
CERTIFICATE OF CORRECTION

PATENT NO. : 5,954,573

DATED : September 21, 1999

INVENTOR(S): Hideki OHGAKI, et al.

It is certified that an error appears in the above-identified patent and that said Letters Patent is hereby corrected as shown below:

On the title page, item [73], the assignee's name should be:

--Linco Japan Ltd.--

Signed and Sealed this

First Day of May, 2001

Attest:

NICHOLAS P. GODICI

Attesting Officer     Acting Director of the United States Patent and Trademark Office